United States Patent
Lasko et al.

[11] Patent Number: 5,847,526
[45] Date of Patent: Dec. 8, 1998

[54] MICROPROCESSOR CONTROLLED FAN

[76] Inventors: William E. Lasko, 820 Lincoln Ave, West Chester, Pa. 19380-0294; Eric L. Canfield, 417 Holly Tree Ct., Chester Springs, Pa. 19425

[21] Appl. No.: 638,997

[22] Filed: Apr. 24, 1996

[51] Int. Cl.$^6$ .................................................. H02P 7/00
[52] U.S. Cl. ........................................ 318/471; 388/934
[58] Field of Search ................................. 318/471, 472, 318/792, 254, 439; 388/903, 934; 361/23, 25, 27

[56] References Cited

U.S. PATENT DOCUMENTS

| | | | |
|---|---|---|---|
| 3,935,522 | 1/1976 | Tsay | 318/283 X |
| 4,506,199 | 3/1985 | Asche | 388/934 |
| 4,722,669 | 2/1988 | Kundert | 388/934 |
| 4,806,832 | 2/1989 | Muller | 361/27 X |
| 5,189,412 | 2/1993 | Mehta et al. | 340/825.22 |
| 5,296,789 | 3/1994 | Ohi | 318/254 |
| 5,592,059 | 1/1997 | Archer | 318/254 |
| 5,605,053 | 2/1997 | Otori | 62/180 |
| 5,613,369 | 3/1997 | Sato et al. | 62/89 |

*Primary Examiner*—Jonathan Wysocki
*Attorney, Agent, or Firm*—Zachary T. Wobensmith, III

[57] ABSTRACT

A system includes a microcontroller for controlling a fan particularly suited to be mounted in a window. The microcontroller monitors and responds at relatively high sampling rates to the actual and desired temperatures of the room associated with the fan. The microcontroller senses a predetermined difference between the desired and actual temperatures to generate the speed, forward-reverse drive and/or on-off controls of the fan and so that the operation of the fan closely tracks the temperature conditions of the room being serviced by the fan.

27 Claims, 10 Drawing Sheets

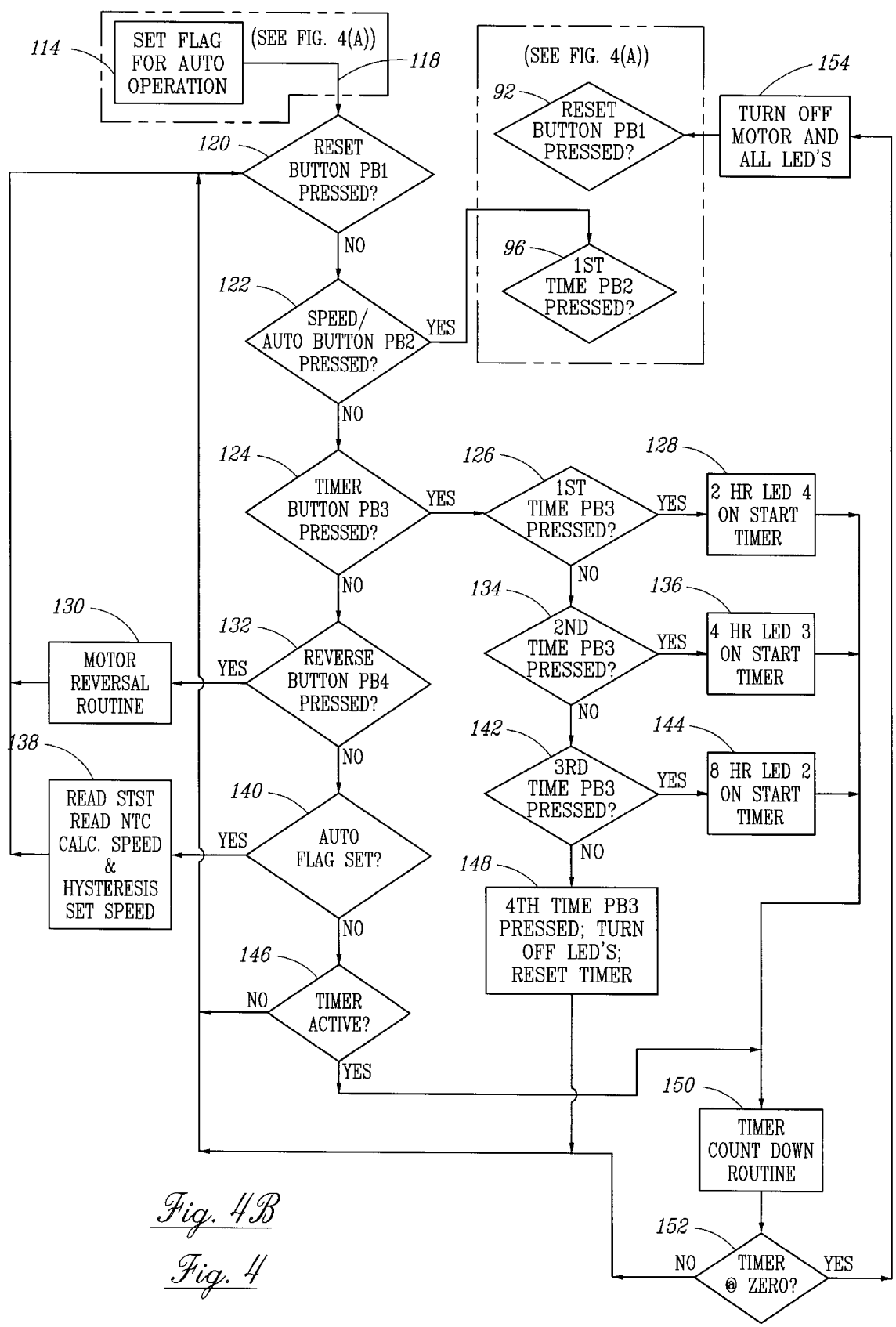

MICROPROCESSOR CONTROLLED FAN

BACKGROUND OF THE INVENTION

1. Field Of The Invention

The present invention relates to a system for controlling a fan. More particularly, the invention relates to a system for controlling a fan that is particularly suited for mounting in a window, with the associated temperature sensing elements of the system being placed in the ambient of the room being serviced by the fan. Specifically, the invention relates to a system for controlling a fan primarily by a microprocessor in conjunction with sensors, that sense the actual and desired temperatures at a relatively high sampling rate to provide real-time measurements and integration of the temperatures, so as to allow for smooth fan operation that closely tracks the temperature of the room being serviced by the fan.

2. Description Of The Prior Art

Fans mounted in windows, within domestic, commercial or industrial applications, typically employ a single transducer, such as a thermostat, as the means for measuring and controlling the temperature of the associated room and for controlling the operation of the fan. Thermostatically controlled window fans typically operate with respect to the room temperature, and do not fully take into account the outside temperature, especially when the fan is selected to draw outside air into a room. If the room temperature is above the thermostat setting, the fan remains on. Historically, an operational flaw occurs when the outside temperature exceeds the room temperature, so that when the fan is running and drawing outside air into a room, the room is actually being warmed up rather than being cooled down and the fan may run indefinitely.

In addition to limitation of non-compensation for outside air or temperature, a fan may be running when in actuality it is desired that the fan be turned off or on, or at least have its speed of rotation increased or decreased, so as to maintain a desired temperature.

Furthermore, the single thermostat may be located in an area which is hotter or colder, relative to the remainder of the room being serviced by the fan. The fan will therefore seek to provide a pleasant environment for the location of the thermostat, whereas the remainder of the room may be unnecessarily warm or cold.

SUMMARY OF THE INVENTION

The present invention is directed to a system for controlling a fan particularly suited to be mounted in a window of a room, that monitors and rapidly responds to the actual and desired temperatures of the room so that the operation of the fan closely tracks the temperature conditions of the room.

The fan comprises a motor responsive to a control signal and excited by a power source having first and second terminals and a first predetermined frequency. The system comprises means for selecting a desired temperature and providing a first electrical signal representative thereof, means for sensing an actual temperature and providing a second electrical signal representative thereof, and means, preferably a microprocessor, for receiving, sampling and interpreting the first and second electrical signals. The sampling is accomplished at a rate that is determined for the system's requirements. The interpreting function in the microprocessor includes determining the difference between the first and second electrical signals, and controlling the speed of the motor with respect to the magnitude of the difference measured.

The microprocessor, in conjunction with two different embodiments of the invention, provides three separate signals so that the fan is operated under three separate speeds, and in another embodiment of the invention provides a single control signal so that the speed of the fan can be continuously adjusted to track the temperature of the room being serviced by the fan.

Accordingly, it is the principal object of the present invention to provide a system for controlling a fan that does not suffer the operational flaw of keeping the fan activated for drawing outside air into a room even when the temperature of the outside ambient is greater than the temperature of the ambient of the room being serviced by the fan.

It is a further object of the invention to provide a system for operating a fan in a relatively smooth manner so that the fan does not experience any speed vacillation in its operation.

Further still, it is an object of the invention to provide a system for operating a fan particularly suited to be mounted in a window, that does not suffer the drawbacks of prior art inventions. Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings, in which.

It of course should be understood that the description and drawings herein are merely illustrative and that various modifications and changes can be made in the structures disclosed without departing from the spirit of the invention.

Like numerals refer to like parts throughout the several views.

DETAILED DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Figure 1:
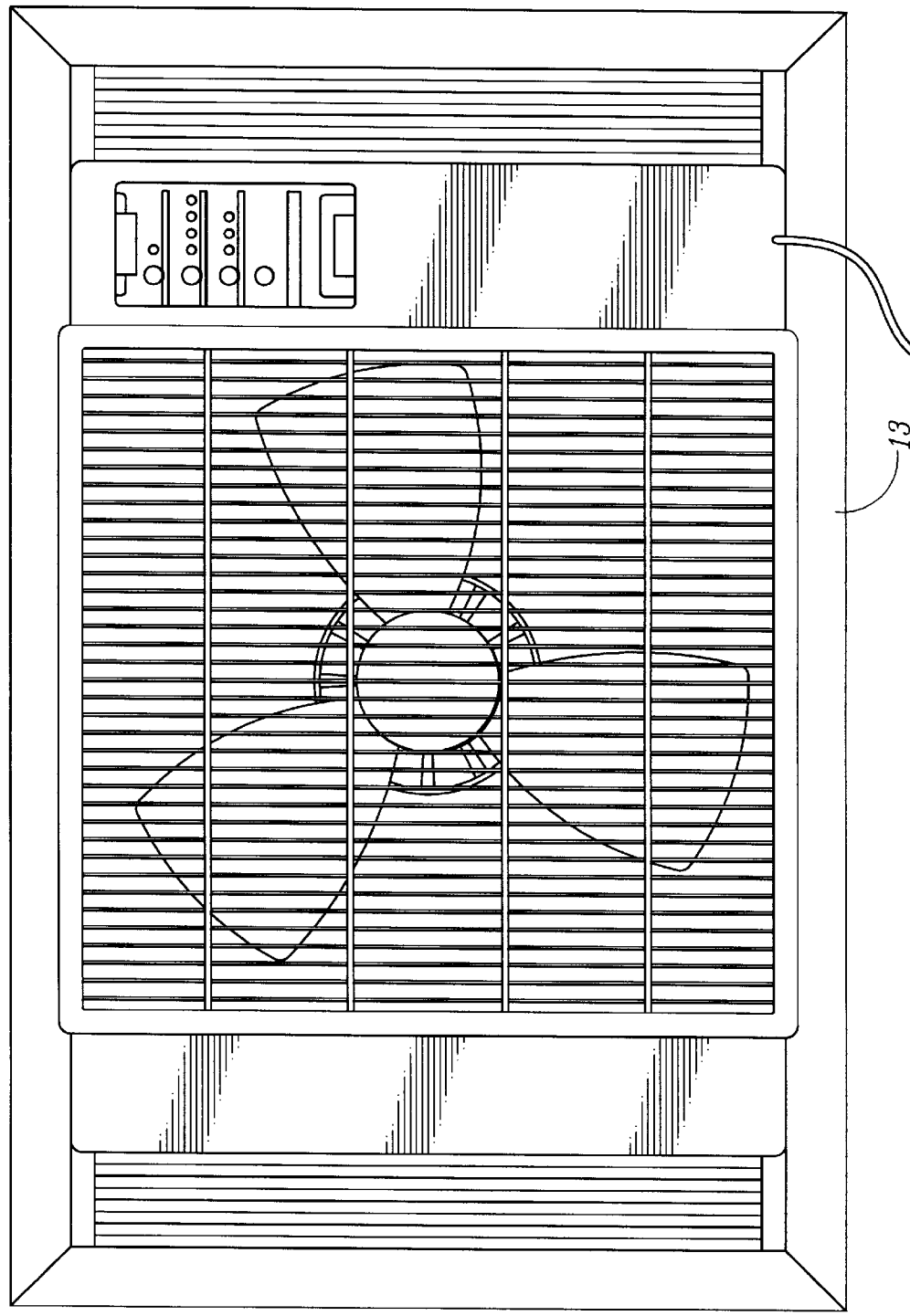
FIG. 1 is a front elevational view of a window fan incorporating the system of the invention.
Figure 1A:
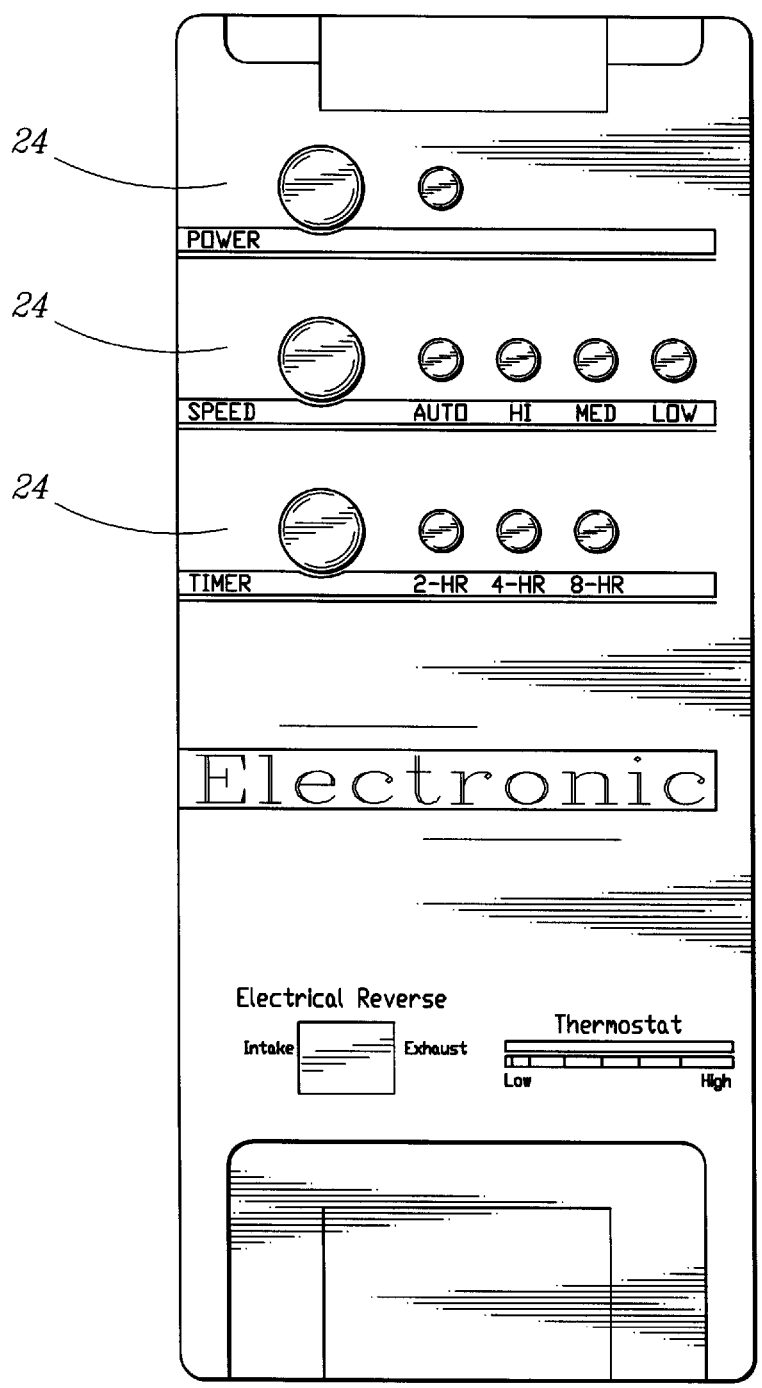
FIG. 1A is a plan view, enlarged, of the external finger touch pad for operating the system of the invention.
Figure 1B:
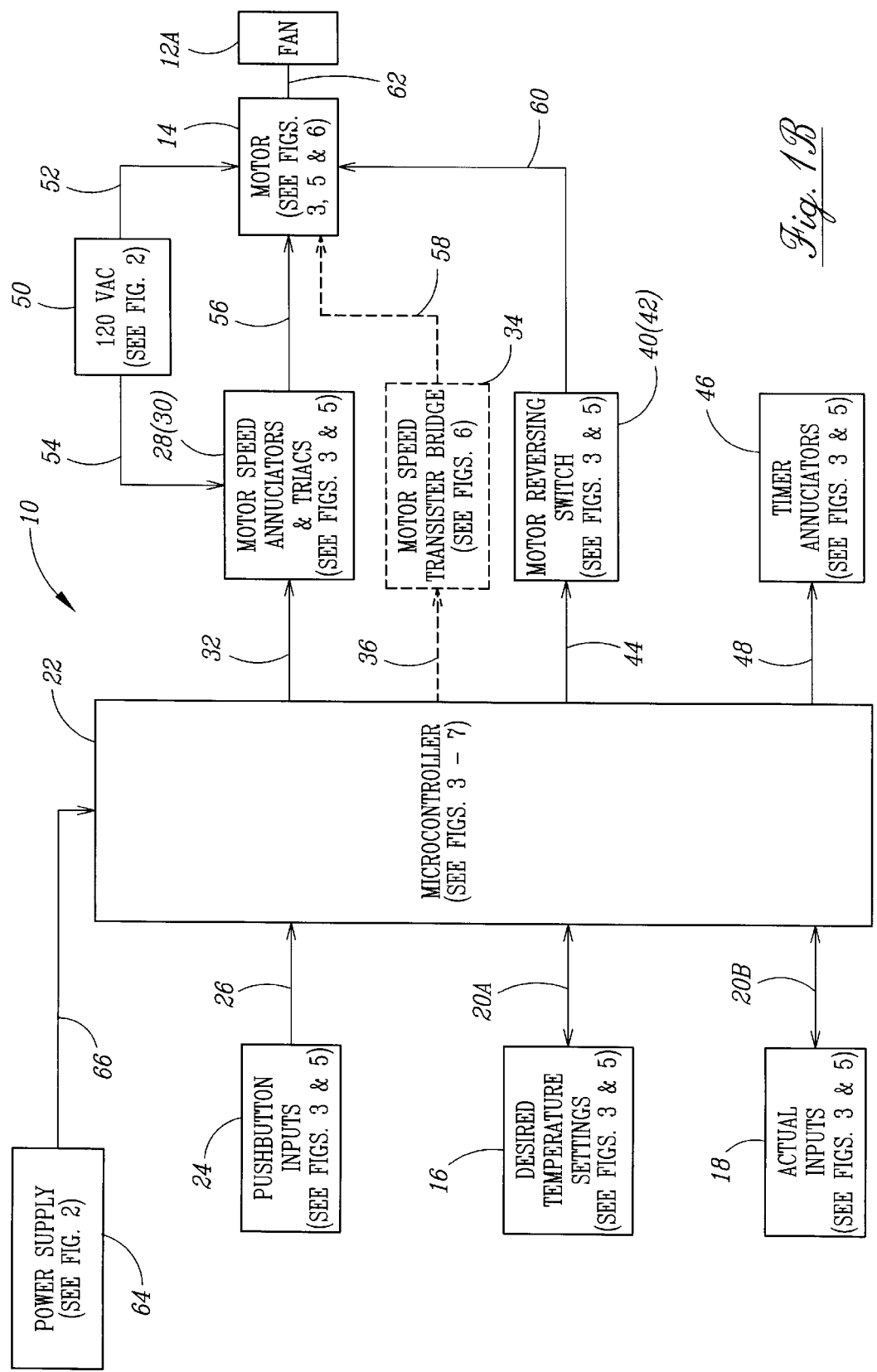
FIG. 1B is a block diagram illustrating the interrelationship between the elements of the various embodiments of the present invention.

Referring to the drawings, wherein the same reference numbers indicate identical or similar elements throughout, there is shown in FIG. 1B a block diagram 10 illustrating the interrelationship of various elements associated with the various embodiments of the invention.

In general, the system 10 of the invention monitors and responds to the actual and desired temperature of a room being serviced by a fan 12 which is particularly suited for being mounted in a window of the room. The fan 12 has an external housing 13 formed of molded plastic, and preferably polyethylene plastic. The system 10 monitors the desired and actual temperatures of the room and, when sensing a predetermined difference therebetween, provides appropriate signals so that the speed, forward-reverse drive, and/or on-off control of a motor 14 driving the fan 12 is correspondingly generated. Furthermore, the system 10 provides the appropriate control signals in a smooth and sometimes continuous manner so as to eliminate any vacillating conditions related to the operation of the motor 14.

The system 10 comprises means 16 for selecting a desired temperature and providing a first electrical signal representative thereof, that is applied to signal path 20A, and means 18 for sensing an actual temperature of the room being serviced by fan 12, and providing a second electrically signal that is applied to signal path 20B. The system 10 further comprises means 22, preferably a microprocessor, for receiving, sampling and interpreting the first and second electrical signals on signal paths 20A and 20B that are routed to the microprocessor 22. The microprocessor 22, is herein termed a microcontroller, which interprets and determines the difference between the first and second electrical signals, and generates appropriate control signals to the motor 14 when the difference therebetween exceeds one or more predetermined values corresponding to one or more ranges of motor 14 operation.

The system 10 preferably further comprises push buttons 24 whose information is routed to the microcontroller 22 via signal path 26. The system 10 preferably further comprises motor speed annunciators and triacs having two embodiments 28 and 30 each of which receives information from the microcontroller 22 on communication path 32, to be described with reference to FIGS. 3 and 5. Alternatively, a motor speed control signal may be provided by an embodiment 34, to be described with reference to FIG. 6, which receives information from the microcontroller 22 on the signal path 36.

The system 10 further comprises a motor reversing switch having two embodiments 40 and 42 that are to be described hereinafter respectively with reference to FIGS. 3 and 5, and each of which receives information from the microcontroller 22 on signal path 44. Further, the system 10 preferably includes timer annunciators 46 which receive information from the microcontroller 22 on signal path 48 and which are to be further described with reference to FIGS. 3 and 5.

Figure 2:
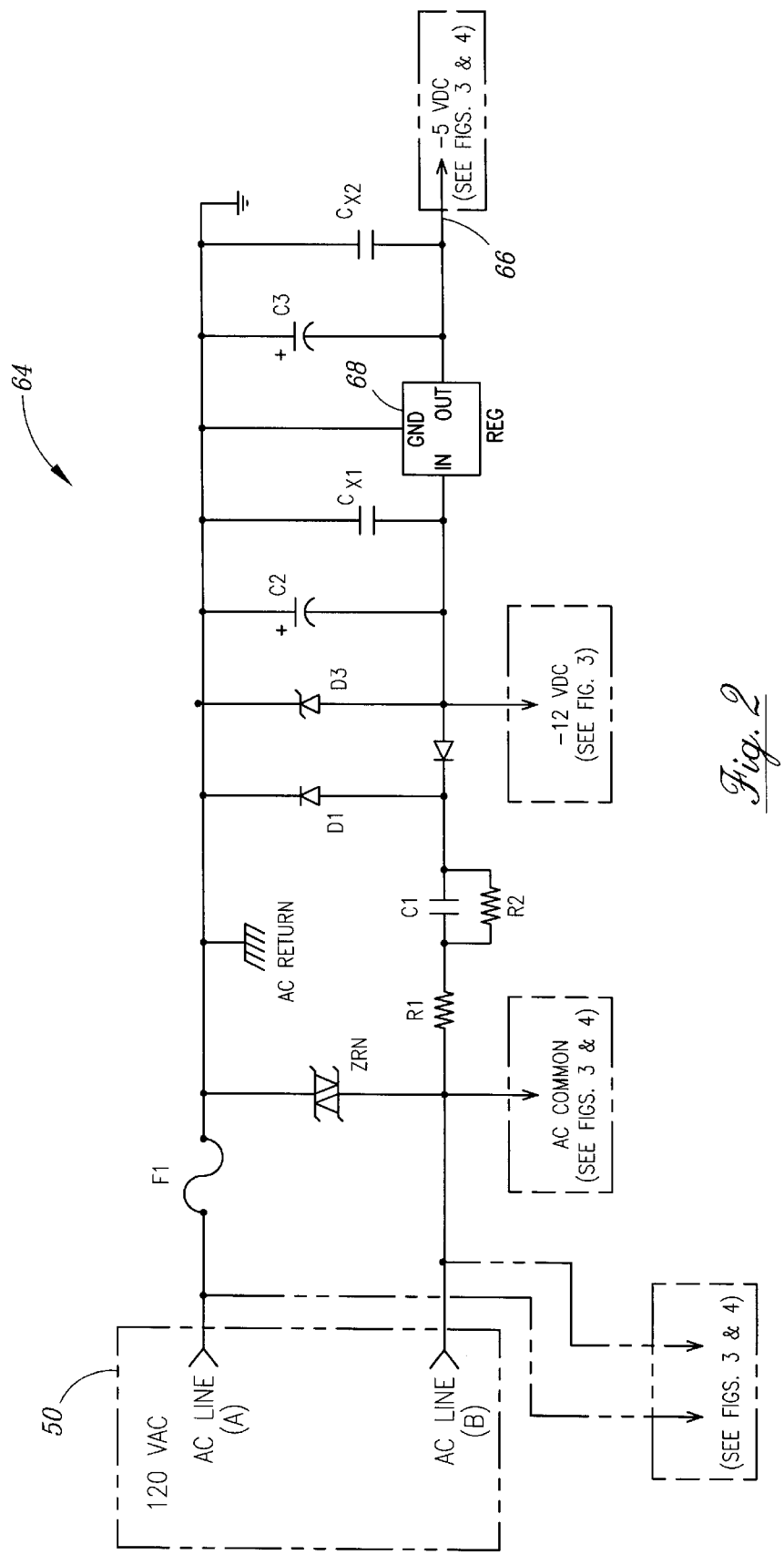
FIG. 2 is a schematic of the power supply of the present invention.

The motor 14 is excited by a power source 50 having typical values of 120 volts a.c. (VAC) and a frequency of 60 Hz. The power source 50 routes the excitation (120 VAC) to the motor 14 via signal path 52, and also supplies excitation to the motor speed controls 28 and 30 via signal path 54. The motor 14, to be further described with reference to FIGS. 3, 5 and 6, is controlled by the information present on signal path 56, 58 (shown in phantom) or 60. The motor 14 has a shaft 62, known in the art, that is controlled by the motor 14 and drives the fan blades 12A. The excitation supplied to motor 14, as well as the power supplied to the other elements of FIG. 1, is provided by a power supply 64, via signal path 66, and which may be further described with reference to FIG. 2, showing a plurality of elements having a typical value or being of a type both of which are listed in Table 1.

TABLE 1

| ELEMENT | TYPICAL VALUE/TYPE |
| --- | --- |
| R1 | 22 ohm 10% 2 W |
| R2 | 220K 5% ¼ W |
| C1 | 2.7 µF 250 V Cap |
| C2 | 3300 µF 16 V Cap |
| C3 | 470 µF 6.3 V Cap |
| $C_{x1}$ | 0.1 microfarads .1 µF 50 V |
| $C_{x2}$ | 0.1 microfarads .1 µF 50 V |
| D1 (diode) | Conventional 1N4004 |
| D2 (diode) | Conventional 1N4004 |
| D3 (zener) | Conventional 1N4743 |
| ZNR (zinc non-linear resistor or metal oxide varistor) | Conventional 130 Vac type |
| F1 (Fuse) | Conventional |

In general, the power supply 64 has input and output stages and is arranged as a half-wave converter. The input stage has means for limiting inrush currents, and transients, while at the same time, providing over-current protection. The output stage has energy storage means that stores a charge for a predetermined duration initiated by the loss of the power source 50 from which the power supply 64 receives excitation as shown in FIG. 2. The output stage has a regulator that provides a constant voltage in spite of most variations in the power source 50, or in spite of most variations in any load that may be connected to the output stage of the power supply 64. The power supply 64 preferably produces and delivers the power needed to operate the electrical and electronic elements of the present invention.

More particularly, the power supply 64 is a transformer-less capacitive, half-wave converter. The reactance of C1 is chosen so as to limit the amplitude of the a-c line voltage that feeds a half-wave converter network, comprising diodes D1 and D2. The resistor R1 is selected to limit the initial inrush current from the power source 50, while the elements F1 and ZNR reduce input stage transients and also provide over-current protection. The resistor R2 is selected to discharge the capacitor C1 upon the removal of the excitation from power source 50 so as to minimize any unwanted shock hazard condition.

Figure 3:
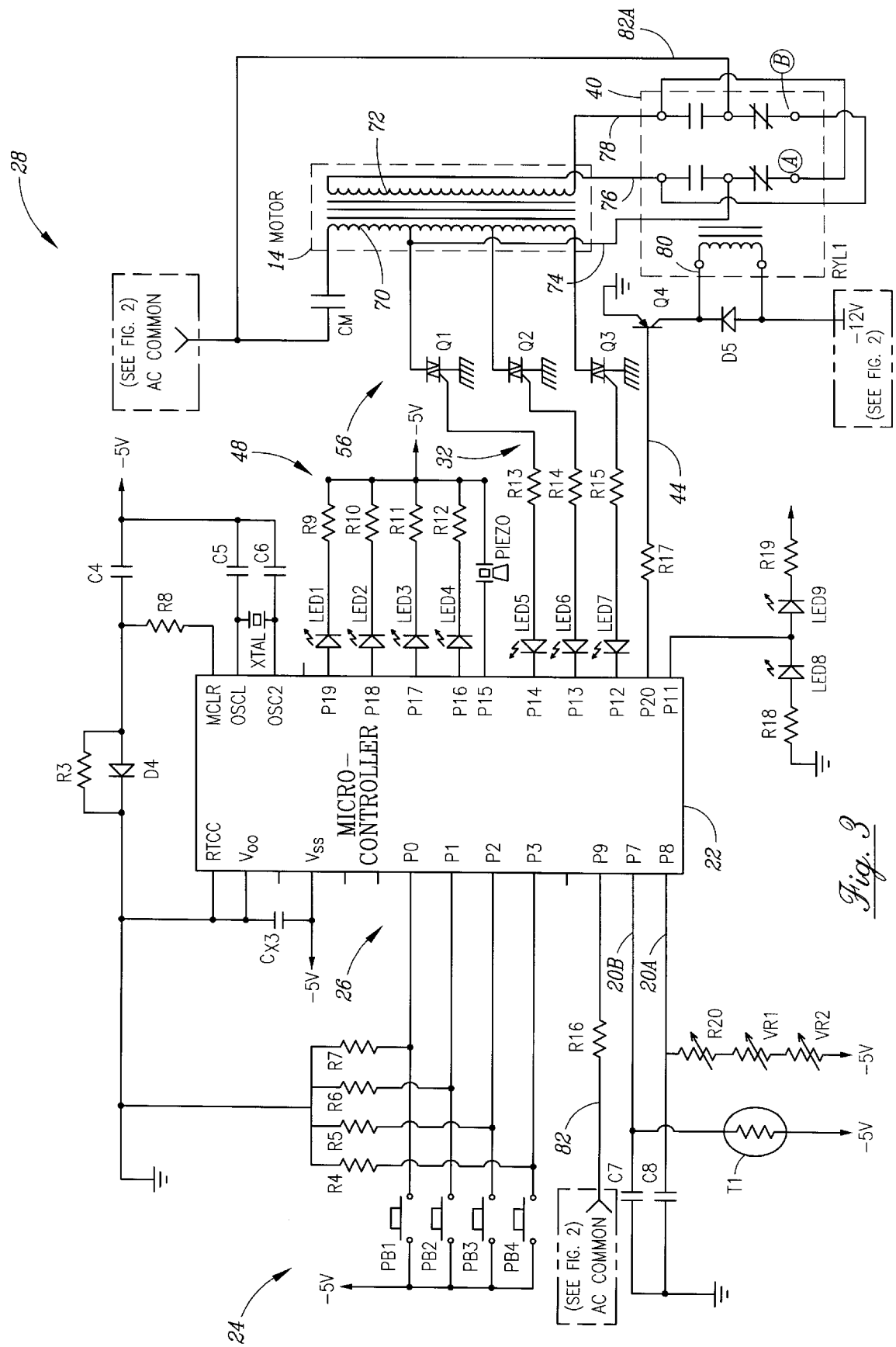
FIG. 3 is a schematic of a first embodiment of the system of the present invention for controlling a fan particularly suited for mounting in a window.
Figure 5:
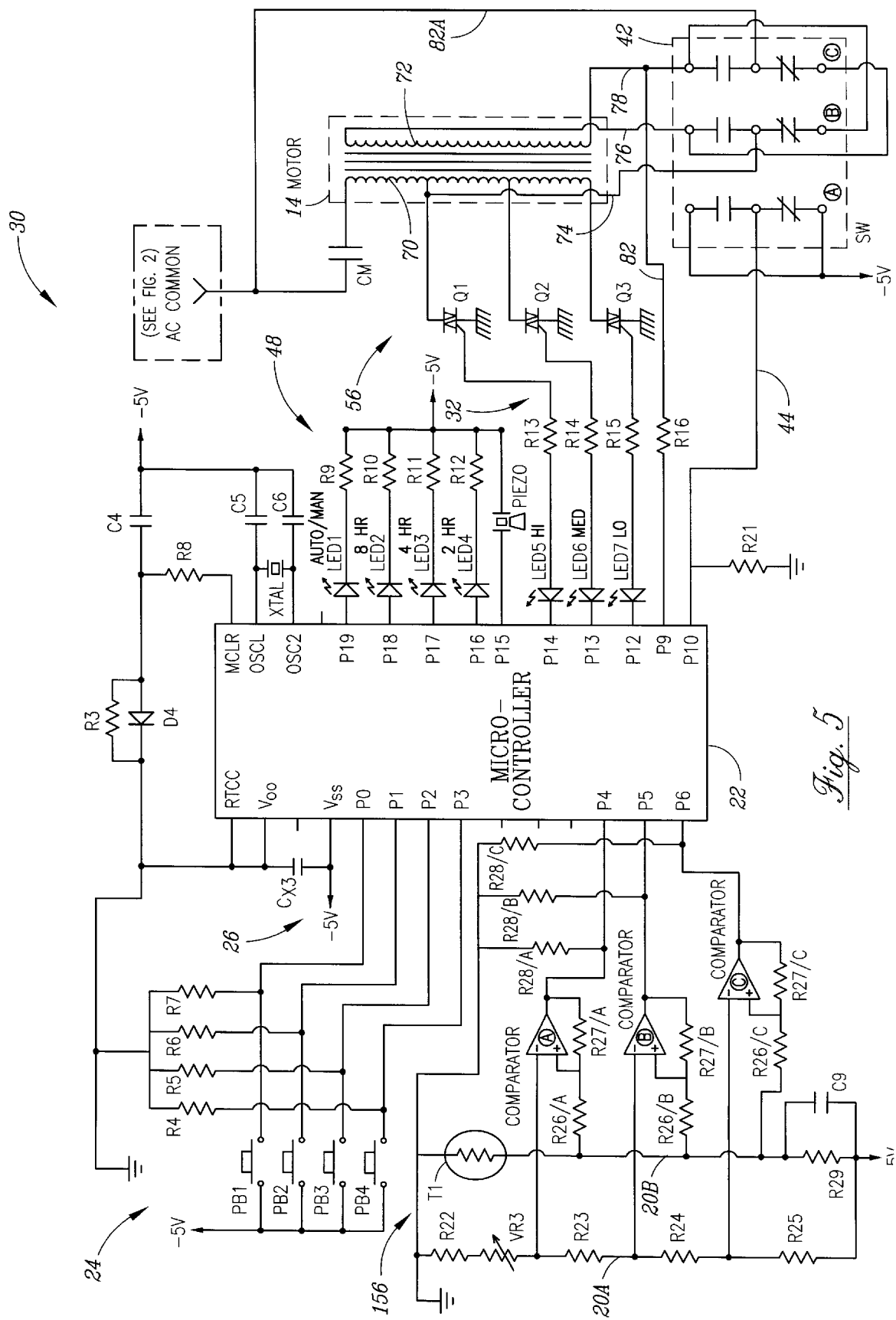
FIG. 5 is a schematic of a second embodiment of the system of the present invention for controlling a fan.
Figure 6:
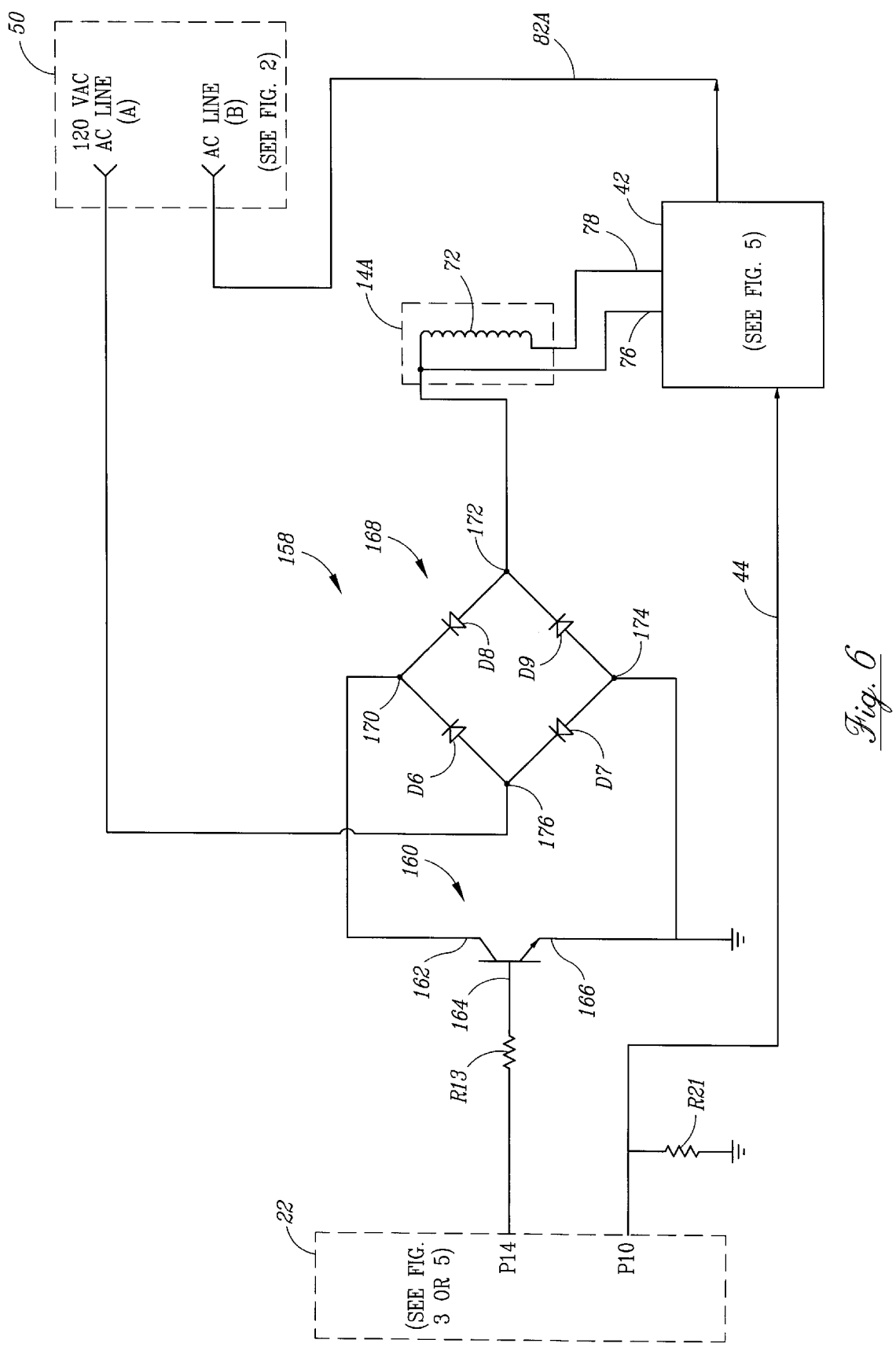
FIG. 6 illustrates an alternative embodiment of the present invention for providing a single control signal that can continuously alter the speed of the fan so that the fan can closely track the associated room conditions.

The zener diode D3 clamps the −12 d.c. volt initial output of the power supply 64, while C2 provides pre-regulation and smoothing of outputs of the power supply 64 and also limits any ac ripple that may be present in −12 d.c. volt output, or in the −5 volt dc output routed, by way of signal path 66, to the embodiments 28 and 30 of FIGS. 3 and 5 respectively.

A voltage regulator 68, known in the art, operates as a negative voltage regulator and provides a −5 volt dc output that is applied to the signal path 66 and which is further filtered by the capacitor C3. The values of the capacitors C2 and C3 are selected to ensure that in the event of a momentary power outage, such as less 10 cycles of the power source 50, the capacitors C2 and C3 act as energy storage devices so that the microcontroller 22 is not reset or suffers any loss of its program memory during this momentary power outage. The capacitors $C_{x1}$ and $C_{x2}$, as well as $C_{x3}$ FIGS. 3 and 5, serve as decoupling capacitors. The power supply 64 references its ground (the ac return lag and circuit ground) as a positive dc leg so as to enable, in a manner known in the art, a more complete control, in all four quadrants, over the thyrstor switching devices, such as the triac Q1, Q2, Q3 that are illustrated in FIG. 3 for the embodiment 28 comprised of a plurality of elements having a typical value/type both given in Table 2.

TABLE 2

| ELEMENT | TYPICAL VALUE/TYPE |
| --- | --- |
| R3 | 1K 5% ¼ w |
| R4 | 10K 5% ¼ w |
| R5 | 10K 5% ¼ w |
| R6 | 10K 5% ¼ w |
| R7 | 10K 5% ¼ w |
| R8 | 1K 5% ¼ w |
| R9 | 1K 5% ¼ w |
| R10 | 1K 5% ¼ w |
| R11 | 1K 5% ¼ w |
| R12 | 1K 5% ¼ w |
| R13 | 1K 5% ¼ w |
| R14 | 1K 5% ¼ w |
| R15 | 1K 5% ¼ w |
| R16 | 1 meg 5% ¼ w |
| R17 | 4.7K 5% ¼ w |
| R18 | 1K 5% ¼ w |
| R19 | 1K 5% ¼ w |
| R20 | 6.8K 5% ¼ w |
| VRI | 2K single-turn PCB pot |
| C4 | 1 μF 16 V Cap |
| C5 | 33 pF NPO Cap |
| C6 | 33 pF NPO Cap |
| C7 | 1 μF 50 V |
| C8 | 1 μF 50 V |
| VR2 | 5K Linear Taper Slide Pot |
| $C_{x3}$ | 0.1 microfarads .1 μF 50 V |
| D4 | Conventional 1N4148 |
| D5 | Conventional 1N4001 |
| LED 1 | Conventional |
| LED 2 | Conventional |
| LED 3 | Conventional |
| LED 4 | Conventional |
| LED 5 | Conventional |
| LED 6 | Conventional |
| LED 7 | Conventional |
| LED 8 | Conventional |
| LED 9 | Conventional |
| PIEZO | Typical piezoelectric device |
| Q1 | Conventional Triac |
| Q2 | Conventional Triac |
| Q3 | Conventional Triac |
| Q4 | Conventional Power Transistor |
| CM | Motor Capacitor |

The capacitor CM serves as a power factor-boosting capacitor which is present together with auxiliary winding 70, sometimes referred to herein as a second winding, and arranged in parallel with the main winding 72, sometimes referred to herein as the first winding, both for the motor 14, which is preferably an induction type.

The microcontroller 22 may be of the type 16C57 available from Microchip.

The microcontroller 22 preferably includes its own regulator, reset, and a non-volatile storage. The microcontroller 22, for the embodiment of FIG. 3, utilizes its ports P0–P3, P7–P9, P11–P20, and its inputs $V_{ss}$, $V_{dd}$, RTCC, MCLR, and outputs OSC1 and OSC2. The outputs OSC1 and OSC2 are used to control a ceramic resonator or crystal (XTAL) so as to provide for an operating clock frequency having a repetition rate greater than the frequency of the power source 50 and preferably to provide for a 50 millisecond sampling rate of the information directed to the microprocessor 22 via its ports.

The microprocessor 22 receives user-initiated information via data bus 26, routed to ports P0–P3 generated by the configuration of a plurality of push buttons (1, 2, 3 and 4) that provide corresponding commands given in Table 3.

TABLE 3

| PUSHBUTTON | COMMAND |
| --- | --- |
| 1 | Reset |
| 2 | Speed |
| 3 | Timer |
| 4 | Reverse |

The microcontroller 22 further receives the first and second electrical signals, previously discussed with reference to FIG. 1, that are routed to ports P7 and P8 via signal paths 20B and 20A respectively. The second signal is generated by a serial arrangement of means T1 (for measuring the actual temperature of a room associated with fan 12) and a capacitor C7, whereas the first electrical signal is generated by a serial arrangement of a temperature setting device VR2, the variable resistor VR1, a resistor R20 and a capacitor C8. Each of the arrangements for generating the first and second signals have opposite ends that are connected to opposite voltage potentials as shown in FIG. 3, and each of the means for generating the first and second signals has a node. The respective nodes are on one side of its respective capacitor C7 and C8 that is respectively applied to ports P7 and P8, as shown in FIG. 3.

The temperature sensing device T1 may be a negative temperature coefficient device, such as a thermistor, or it may be a thermocouple device, the operation of each being known in the art. The temperature setting device VR2 is preferably a potentiometer whose operation is also known in the art.

The thermostat VR1 and the temperature sensing device T1 such as the negative temperature coefficient thermistor T1 operate independently, and the thermostat is calibrated with the thermistor. The thermostat VR2 is preferably chosen to have a range of approximately 15° Fahrenheit (F), with the center position thereof preferably corresponding to 70° F. Although the negative temperature coefficient thermistor T1 is a non-linear device, its response over the 15° F., relative to VR2, is substantially predictable within a certain degree of accuracy.

The microcontroller 22 has an operating routine which performs the calibration mode of the thermostat VR2 against thermistor T1. The calibration mode is entered, to be described hereinafter with reference to FIG. 4, and the microcontroller 22 acknowledges the calibration mode command by periodically causing its port P15 to be pulsed so that four short beeps are generated by the piezo device (PIEZO) connected to P15. During this calibration procedure, the first interactive step with a user is to set the VR2 thermostat to the approximate ambient temperature of the environment where the calibration is being performed, and to which the negative temperature coefficient thermistor T1 is exposed. After presetting VR2, the adjustable resistor VR1 is calibrated and the port P8 is monitored by the microcontroller 22 until the electrical signal present on port P8 is substantially that which is present on port P7 (derived from the thermistor T1). The adjustment of VR1 continues until an auto indicator (LED 1) is illuminated (to be described) by the microcontroller 22, indicating that the thermistor T1 and the thermostat VR2 each provide an electrical signal which is approximately equal to each other. The reset (PB1) is then depressed by the user to exit from the calibration mode, and to cause the microcontroller 22 to be made ready for its operational mode.

In operation, upon the application of power to the microcontroller 22 delivered by the power supply 64, a reset signal is applied to the MCLR input, via the circuit elements R3, D4, C4, and R8 arranged as shown in FIG. 3. The ports OSC1 and OSC2 then drive XTAL to provide the operating clock for the microcontroller 22 which establishes all clock and timing operations.

After receiving the reset signal on the MCLR input, the microcontroller 22 initializes all ports shown in FIG. 3 as follows:

P12, P13 and P14 are set high, that is, the active or one state of that port, ensuring that the Q1, Q2 and Q3 triacs are not energized (motor 14 is placed into its off condition) and also ensuring that the associated LED's (LED 5, LED 6 and LED 7 respectively connected to Q1, Q2 and Q3 via resistors R13, R14 and R15), are extinguished; P16, P17 and P18 are sequentially illuminated to indicate that the speed selected for the fan 12 is waiting to be programmed; P19 is set low, that is, the zero or inactivate state of that port, indicating manual operation of the fan (LED 1 is extinguished); P11 is set low, illuminating LED 9, which indicates one of the motor's rotational direction (LED 9 ON—INTAKE AIR; or LED 8 ON—EXHAUST AIR); P15 is set low, so that the piezo device (PIEZO) is not enabled; and ports P0, P1, P2, P3 are established as inputs to receive the reset, speed, timer and motor reversal push buttons activations respectively; P9 is established as an input for the current-limited monitoring of the zero-crossing of the power source 50; P7 and P8 are initialized as inputs, and the thermistor T1 and the thermostat VR2 are monitored (via signal paths 20B and 20A) at ports P7 and P8.

Preferably after the calibration mode (previously described) has been requested and performed, the microcontroller 22 enters a push-button polling routine wherein all the push buttons are scanned during this time, waiting for an appropriate input to be initiated by the user. The fan 12, in response to the microprocessor 22, has several different modes of operation which are tabulated in Table 4, which also gives a general description of such modes.

TABLE 4

| MODE | GENERAL DESCRIPTION |
| --- | --- |
| Automatic Mode | The fan 12's speed and cycling is related solely to the room temperature sensed by the thermistor T1 and set by the thermostat VR2 settings, and operates indefinitely. |
| Manual Mode | The fan 12 runs continuously at a speed selected by the user without respect to the temperature of the room being serviced by the fan. |
| Timer Mode/Manual | The fan 12 operates at the manually programmed speed, without respect to room temperature, for the amount of time selected (2, 4 or 8 hours), and then is automatically shut off. |
| Timer Mode/Automatic | The fan 12's speed and cycling operates with respect to the room temperature for the amount of time programmed by the user (2, 4 or 8 hours) and then is automatically shut off. |

All of the modes illustrated in Table 4 have access to motor reversal capability of the invention and which for the embodiment of FIG. 3 may be accomplished by reversing switch device 40. The reversing switch device 40 has at least four terminals, one of which is respectively connected to the common between the first transistor means (Q1) and a first connection of the second winding 70 and is indicated as signal path 74. The first winding 72 of motor 14 has its opposite ends connected to two of the terminals of the reversing switch device 40 by way of signal paths 76 and 78. The reversing switch device 40 has an input control winding 80 that is responsive to the microcontroller 22, more particularly, to port 20 of the microcontroller 22 via resistor R17 (signal path 44), the transistor switch Q4 and the diode D5 having its anode connected to the −12 volt dc supplied by the power supply 64. The fourth terminal of the reversing switch device 40 is connected, via signal path 80A, to one of the terminals of the power source 50, that is, the AC common terminal shown in FIG. 2.

In operation, when the motor reversal push button PB4 is pressed by a user, the transistor Q4 is immediately de-energized and, preferably one (1) second later, the microcontroller 22 causes port P20 to change state which, in turn, changes the state of the relay reverse switching device 40, in particular, the normally opened and normally closed contacts, poles or relays of the device 40 as shown in FIG. 3. Three seconds later, the appropriate triac Q1, Q2, Q3 is re-energized and the rotation of the motor 14 is changed due to the switching arrangement provided by the relays (normally open and closed poles shown in FIG. 3) reversing switching device 40. If the motor 14 is already off, there is no delay in the changing of the state of the relays of the reversing switch 40. The delay in the shut down of the associated triac Q1, Q2 or Q3 is advantageously done to ensure that the triacs Q1, Q2, Q3 never experience any type of short circuit configuration or instantaneous discharge of the motor capacitor CM. The reversing switch device 40 uses a double-pole-double-throw (DPDT), break-before-make contact arrangement, that is cross connected (as shown in FIG. 3) to achieve the motor reversal configuration. During such reversal, port P11 illuminates either LED 8 or LED 9, respectively dependent on whether the motor 14 rotation direction is operating the fan 12 in its exhaust or intake condition.

In addition to the motor reversal feature of the invention, the embodiment 28 of FIG. 3, as well as the embodiment 30 of FIG. 5, to be described, has the ability to monitor for the presence of an active condition of the power source 50. The monitoring capability is provided by the microcontroller 22, utilizing its port P9 which is connected (via resistor R16) to one of the terminals (AC common) of the power source 50, via signal path 80 which in actuality is the same as signal path 80A.

In operation, the microcontroller 22 utilizes port P9 to look at the transition of the power line cycle. The same poling routine that samples the push buttons 24 also monitors the transition of the power line cycle. In the event that power fails, as detected by the lack of transition on port P9, the triacs Q1, Q2, Q3 are immediately turned off. The carry over capability, that is, the ability of the capacitors C2 and C3 to store a charge when the power source 50 is lost, as previously discussed with reference to FIG. 2, ensures that the microprocessor 22 has enough time to turn off the triacs Q1, Q2 and Q3 when the transition is lost which, in turn, means that the power source 50 is lost, that is, inactive and dormant. This monitoring of the sinewave zero-crossing (transition of the signal produced by the power source 50) prevents the following catastrophic fault from occurring:

Assuming that the reversing switching device 40 is energized, that is, a signal is generated by the microcontroller 22 and applied across the control winding 80 via signal path 44 (port P20-resistor R17, transistor Q4, diode D5 and the −12 VDC potential) causing the motor 14 to be energized; and then the ac power fails, that is, power source 50 becomes inactive. In the event of a very brief failure, it is possible for the relay 40, because of its power consumption at a higher voltage, to actually change state (normally opened poles change to closed) without the microcontroller 22 resetting or losing its memory contents. When the power is then restored, it momentarily presents a short circuit configuration (as the relay has not yet changed state upon power restoration) to one of the triacs (Q1, Q2 and Q3) which has been held in conduction, which would otherwise cause catastrophic failure to that triac (Q1, Q2 or Q3) which had not changed state. The present invention provides the carry-over capability of the power supply 64 to primarily prevent, this catastrophic failure.

The microcontroller 22 provides all the features of the modes of Table 4, with the automatic mode being the most proficient in operating the fan 12 so that the fan 12 tracks the temperature conditions of the associated room being serviced by the fan 12. In operation, the thermostat VR2 is set by a user to a desired temperature for the room and the thermistor T1 responds to the actual temperature conditions of the room. The thermostat VR2 and the thermistor T1 are sampled by the microcontroller 22, at a desired sampling rate of about 50 milliseconds, and a corresponding fan speed is provided relative to the difference between the two is enabled. To sample either the thermistor T1 or the thermostat VR2, the corresponding port P7 or P8 is changed from an input port to an output port and made high so that the C7 and C8 capacitors are at the same potential at their nodes which respectively correspond to signal paths 20B and 20A. The output port P7 or P8 is then changed to an input port P7 or P8 and the corresponding capacitor C7 or C8 is then charged because of the current supplied from the voltage potential (−5V d.c.) through the resistance of the thermistor T1 or through the resistive network comprising R20 and VR1 and VR2. The amount of time that it takes for a logical transition of the associated port (P7 or P8) to go from its high to its low condition, is relative to the resistance (and the associated current flow as related by ohm's law and the charge/time constant of the capacitor C7 or C8) of the associated signal paths 20A and 20B. This time is in multiples of 10 microseconds which is directly related to the microcontroller's 22 clock cycle. Thus, the room temperature, that is, the representative resistance of the thermistor T1, becomes a pulse count (in 10 microsecond increments) as does the thermostat VP2 setting (the combination of R20, VR1 and VR2).

The states of operation of the microcontroller 22 (with respect to temperature, not pulse counts) are as follows: (a) when the room temperatures sensed and represented by the electrical signal supplied by thermistor T1, is below the setting of the thermostat VP2, that is, the electrical signal supplied by the thermostat VR2, the motor 14 is not energized; (b) when the room temperatures sensed by the thermistor T1 is less than 2° F. (all temperatures given in fahrenheit) above the thermostat VR2 setting, port 12 is made low, energizing triac Q3 and illuminating LED 7, while placing the motor 14 into its low speed condition; (c) when the room temperature sensed by the thermistor T1 is between 2° and 5° F. above the thermostat VR2 setting, port P13 is made low, energizing triac Q2 and illuminating LED 6, and causing the motor 14 to be operated at its medium speed; and (d) when the room temperature sensed by thermistor T1 is more than 5° above the thermostat VR2 setting, port 14 is made low, energizing triac Q1 and illuminating LED 5 and causing the motor 14 to be operated at its high speed.

In the automatic mode, the microcontroller 22 provides for a hysteresis effect so that the operation of the motor 14 does not experience any vacillations. To accomplish such hysteresis, the microcontroller 22 is programmed to recognize and provide two basic transfer functions, the first being one which recognizes the room temperature rising and falling, and the second being that predetermined set points for the selection of the motor's speed are established. More particularly, as the room temperature, as sensed by the thermistor T1, increases and passes (in an increasing manner) the predetermined set points (relative to the thermostat VR2 settings, such as the 2° and 5° F. ranges previously discussed) established for the motor speed, two pulse counts are added to the room temperature pulse count, that is, the pulse count originally derived by the microcontroller 22 converting the analog first electrical signal present on signal path 20B into a digital quantity represented by pulse counts. As the room temperature, as sensed by the thermistor T1, decreases and passes (in a downward manner) the predetermined set points established for the motor speed, two pulse counts are subtracted from the room temperature's pulse count. By adding and subtracting pulse counts as the room temperature transitions through preestablished set points, no oscillation of the motor speed takes place. The maximum total accumulated error (due to offsetting the room temperature pulse count in a single direction) that the microcontroller 22 may experience never exceeds 1° F.

The microcontroller 22 to accomplish its operation of the manual mode, utilizes ports P12, P13 or P14. The selection of port P12, P13 or P14 allows the motor 14 to operate at low, medium or high speed (previously described), respectively, for an indefinite period of time without respect to room temperature sensed by the thermistor T1 or set by the thermostat VR2 because these devices are not sampled in the manual mode.

The microcontroller 22 accommodates the timer mode/manual mode by use of ports P16, P17 and P18, more particularly, once a speed is selected for manual operation, the timer option can be selected (to be further described with reference to FIG. 4). At the conclusion of the selected options, such as 2, 4 or 8 hour times, the motor 14 is shut off. Ports P16, P17 and P18 control the activation of the LED annunciators (LED 4, LED 3 and LED 2 which are part of motor speed annunciators illustrated in FIG. 1). If the program timer of the microcontroller 22 is programmed for an 8 hour operation, the corresponding 4 hour and 2 hour LED 4 and LED 2 respectively illuminates upon counting down the program timer of the microcontroller 22, while extinguishing the preceding illuminator LED. After the time period (2, 4 or 8) has been completed, the microcontroller 22 returns to the original LED sequencing mode and also to polling the push buttons 24. The microcontroller 22 accommodates the timer mode/automatic mode by utilizing the automatic mode functions previously described. More particularly, the thermistor T1 measuring the room temperature provides a signal that is compared relative to the thermostat VR2 setting and such a difference determines the motor speed, while the program timer of the microcontroller 22 controls the total operation. During the various modes given in Table 4, the push buttons are constantly polled for any user input activity. Whenever a valid push button entry is made, the piezo device (PIEZO) activates briefly to provide positive feedback to the user. The operating modes may be further described with reference to FIG. 4 composed of FIGS. 4(a) and 4(b) comprised of program segments including decisional or processing functions respectively indicated by diamond shaped configurations and rectangular boxes, all of which are given in Table 5 along with their associated nomenclature.

TABLE 5

| REFERENCE NO. | NOMENCLATURE |
|---|---|
| 84 | Start |
| 86 | Reset microcontroller, initialize ports; set flags |
| 88 | Run calibration routine |
| 90 | Calibration requested within two seconds |
| 92 | Reset button (PB1) pressed |
| 94 | Speed/auto button (PB2) pressed |
| 96 | 1st time PB2 pressed |
| 98 | Manual operation low speed |
| 100 | Loop delayed for LED advance |
| 102 | 2nd time PB2 pressed |
| 104 | Manual operation medium speed |
| 106 | Reset delay counter; advance timer LED |
| 108 | 3rd time PB2 pressed |
| 110 | Manual operation high speed |
| 112 | 4th time PB2 pressed |
| 114 | Set flag for auto operation |
| 116 | 5th time PB2 pressed; turn off speed/auto LEDS' and motor |
| 120 | Reset button PB1 pressed |
| 122 | Speed/auto button PB2 pressed |
| 124 | Timer button PB3 pressed |
| 126 | 1st time PB3 pressed |
| 128 | Two hour LED 4 ON start timer |
| 130 | Motor reversal routine |
| 132 | Reverse button PB4 pressed |
| 134 | 2nd time PB3 pressed |
| 136 | Four hour LED 3 ON start timer |
| 138 | Read thermostat (STAT), read thermistor (NTC) calculate speed and hysteresis set speed |
| 140 | Auto flag set |
| 142 | 3rd time PB3 pressed |
| 144 | Eight hour LED 2 ON start timer |
| 146 | Timer active |
| 148 | 4th time PB3 pressed; turn off LEDS; reset timer |
| 150 | Timer count down routine |
| 152 | Timer set to zero (0) |
| 154 | Turn off motor and all LEDS |

Figures 4, 4A:
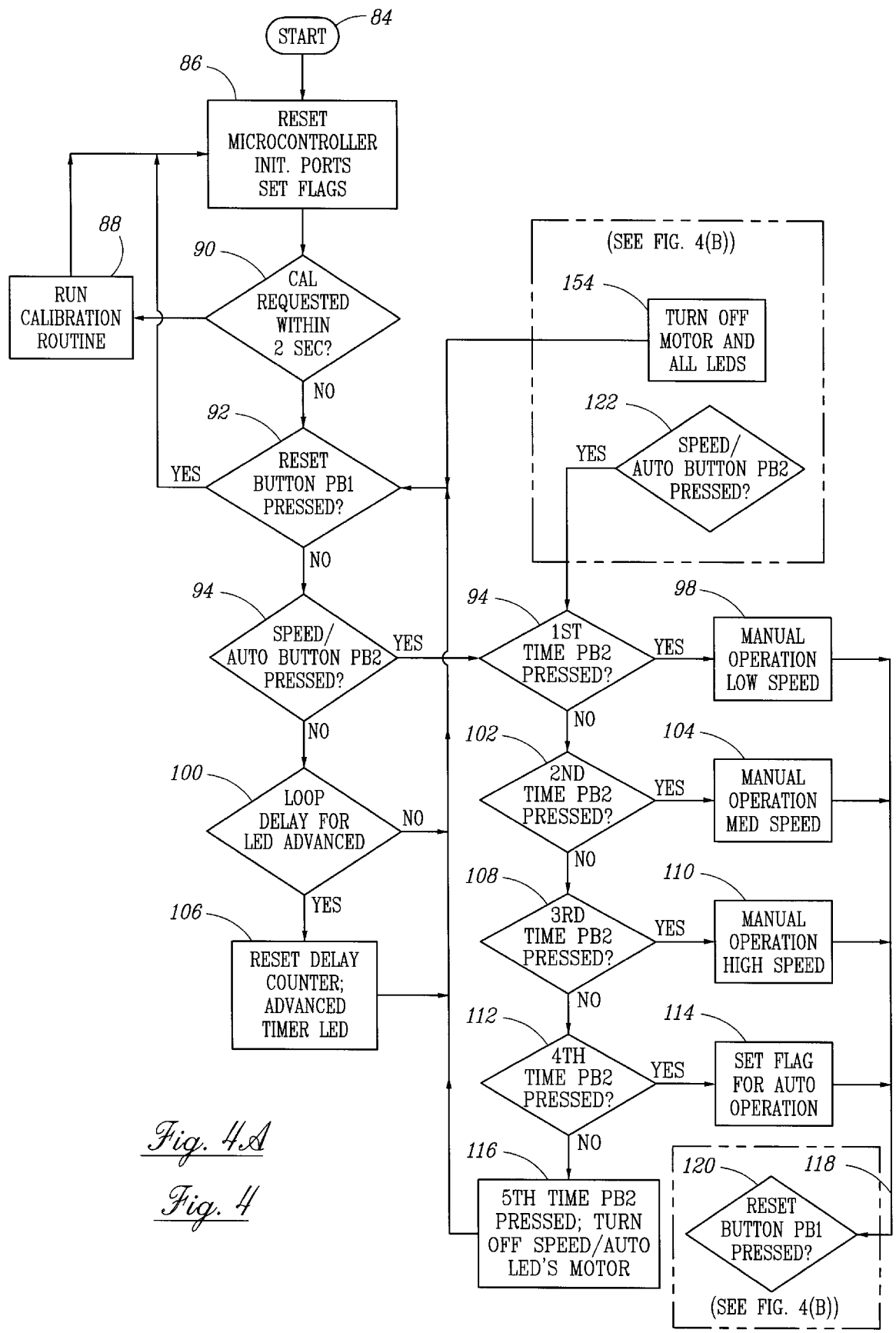
FIG. 4 is composed of FIGS. 4(A) and 4(B) which cumulatively illustrate a flow chart related to the operation of the present invention.

With reference to FIG. 4(a), the start event 84 is created by the power up condition, previously described, of the microcontroller 22 and the initialization process 86, having the parameters shown in FIG. 4(a), is performed and when completed, the operating routines of the microcontroller 22 sequences the operating program to program segment 90 which monitors for the calibration request, previously discussed, and when present performs the run calibration routine 88, also previously discussed. If the calibration request of program segment 90 is not received within 2 seconds measured from the start event 84, the operating program sequences to program segment 92 of the microcontroller 22.

Program segment 92 is interrelated to the polling operation for monitoring the push buttons 24, in particular, the reset push button (PB1) and if PB1 is depressed, the microcontroller 22 performs the initialization program 86 and, conversely, if not depressed, the program of the microcontroller 22 sequences to program segment 94 which monitors for the speed/auto push button (PB2) to be depressed and if PB2 is not depressed, the operating program of the microcontroller 22 sequences to program segment 100.

If program segment 100 is not applicable that is, there is no advancement of LEDS and, therefore, no need for the loop delay of program segment 100, then the operating program of the microcontroller 22 sequences to program segment 106 for resetting delay counters and advancing timers, all to be described hereinafter with reference to FIG. 4(b).

Once the push button PB2, related to program segment 94, is depressed, the operating program of the microcontroller 22 sequences to either program segment 96, 102, 108, 112, or 116 dependent upon the number of times that the push button PB2 is depressed. More particularly, if the push button PB2 is depressed once, the microcontroller 22 provides (program segment 90) the proper signal so that the low speed is delivered to the motor 14; and if the push button PB2 is depressed two or three times, then the microcontroller 22 provides (program segment 104 or 110) a signal so that the motor 14 is driven at its medium or high speed, as shown in FIG. 4(a). If the push button PB2 is depressed four times, then the microcontroller 22 seeks and obtains its auto operation previously discussed. Finally, if the push button PB2 is depressed five times, then the speed control and LEDS, as well as the motor 14, are all placed into their off or inactive condition. If the program does not sequence down to program segment 116, related to the five times depression of push button PB2, the operating program sequences on signal path 118 to check for the reset push button PB1 illustrated by program segment 120, which may be more fully described with reference to FIG. 4(b).

As seen in FIG. 4(b), program segment 120 checks to see if the reset push button PB1 is pressed and, if yes (not shown), then the reset operation is performed in a manner previously discussed with reference to program segment 92 of FIG. 4(A) and if no, the operating program of the microcontroller 22 sequences to program segment 122 that checks for the occurrence of speed/auto push button PB2 being depressed. The program segment 122 is the same as program segment 94 previously discussed with reference to FIG. 4(a). If the speed/auto push button PB2 is not depressed, the operating program of the microcontroller 22 sequences to program segment 124 which monitors for the timer button PB3 to be depressed or not. If the push button PB3 is not depressed, the program sequences to program segment 132.

Program segment 132 monitors to determine if the reverse button PB4 is depressed and if so performs the motor reversal routine process previously discussed. If the reverse push button PB4 is not depressed, the program of the microcontroller 22 sequences to program segment 140 which checks for the auto flag set which was or was not set by program segment 114 of FIG. 4(a). If the auto flag is set, the program sequences to program segment 138 which performs the automatic mode previously discussed. If the auto flag is not set, the program sequences to determine if any timer (2, 4, or 8 hours) is active and if no, returns to the program segment 120, and if yes, sequences to program segment 150.

If the timer push button (PB3) is depressed as verified by program segment 124, the program sequences to either program segment 126, 134, 142 or 148 which respectively check for the first, second, third or fourth times that the push button (PB3) is depressed. If the timer push button PB3 is depressed only once, a two hour timer is started and LED 4 is activated (see program segment 128); if the timer push button PB3 is depressed twice, a four hour timer as well as its related LED 3 is activated (see program segment 136), if the timer push button PB3 is depressed three times, then an eight hour timer is started and LED 2 is activated (see program segment 144) and, finally, if the push button PB3 is depressed four times, then all LEDS are turned off and the timer is reset, as shown in program segment 148. Upon completion of program 148 the operating program of the microcontroller 22 sequences back to monitoring the reset push button PB1 (program segment 120).

If the timer push button PB3 is depressed once, twice or three times, the respective program segments 128, 136 and 144 sequences to program segment 150 which is a timer count down routine for the respective timer (2, 4 or 8 hours) and, upon the completion of program segment 150, the program of the microcontroller 22 sequences to segment 152 which sets all the timers to zero (0) and then sequences to program segment 154. Program segment 154 turns off the motor and all LEDS thereby placing the motor 14 in its dormant condition. The operation of the motor 14 may be accomplished by an alternative control system 30 which may be described with reference to FIG. 5.

An embodiment 30 is shown in FIG. 5 which is similar to the embodiment 28 of FIG. 3, with the exceptions that the automatically operating reversing switch 40 of FIG. 3 is replaced with a manually operated reversing switch 42, and also that the serial arrangements of FIG. 3 of the thermistor T1 and the thermostat VR2 each having an energy storage device, such as capacitor C7 or C8, are replaced with an arrangement 156 comprising voltage dividers and comparators COMP A, COMP B, COMP C.

With regard to the manual reversing switch 42, the previously discussed connections of the motor 14 via signal paths 74, 76, 78 and 82A of FIG. 3 are the same as those shown in FIG. 5. The reversing switch 42 is a manual side switch comprising a three (A, B and C each being represented as being enclosed by a circle) poled double-through device, with break-before-make contacts. The poles B and C (each comprising normally open and closed contact) shown in FIG. 5 perform the same reversal function as those of the reversing switch 42 of FIG. 3. The pole A of the switch 42 is connected to the microcontroller 22 via the signal path 44, and notifies the microcontroller 22 when the switch 42 is mechanically activated so as to cause the direction of the rotation of the motor 14 to be reversed by microcontroller 22 in a manner similar to that described with reference to FIG. 3. When the switch movement is detected by the microcontroller 22 by the presence of an input on port 10, the microcontroller 22 activates a routine so as to immediately shut down any energized triac Q1, Q2 or Q3 and delays re-energization of the motor 14 for a time duration which exceeds a predetermined time duration for the completion of the switching operation of the switch 42.

The comparator network 156 of FIG. 5 comprises a plurality of elements of a typical value or type given in Table 6.

TABLE 6

| ELEMENT | TYPICAL VALUE/TYPE |
| --- | --- |
| R22 | 9.1K 5% ¼ W |
| R23 | 1K 5% ¼ W |
| R24 | 1.3K 5% ¼ W |
| R25 | 10K 5% ¼ W |
| R26A | 10K 5% ¼ W |
| R26B | 10K 5% ¼ W |
| R26C | 10K 5% ¼ W |
| R27A | 10M 5% ¼ W |
| R27B | 10M 5% ¼ W |
| R27C | 10M 5% ¼ W |
| R28A | 4.7K 5% ¼ W |
| R28B | 4.7K 5% ¼ W |
| R28C | 4.7K 5% ¼ W |

TABLE 6-continued

| ELEMENT | TYPICAL VALUE/TYPE |
| --- | --- |
| R29 | 10K 5% ¼ W |
| COMP A | Conventional comparator |
| COMP B | Conventional comparator |
| COMP C | Conventional comparator |

The comparator arrangement 156 converts the first and second electrical signals present on signal paths 20B and 20A, discussed with reference to FIGS. 1 and 3, into a signal which represents the difference therebetween and which different signal is routed to either port P4, P5, P6 of the microcontroller 22. The first electrical signal is set by the thermostat VR3 (same as VR2 of FIG. 3), whereas the second electrical signal is generated by the negative temperature coefficient device T1 or the thermocouple both previously discussed. The thermostat VR3 is arranged with a step voltage divider network and has a plurality of stages of a predetermined number as also shown in FIG. 5, with each stage including a resistor, and with the first stage thereof also including the thermostat VR3. The divider network has opposite ends connected to opposite voltage potentials as shown in FIG. 5.

The thermistor T1 or thermocouple T1 is arranged in series with a resistor R29 preferably having a capacitor C9 thereacross, and the serial arrangement is connected across opposite voltage potentials, as shown in FIG. 5. A node between the thermistor T1 and the resistor R29 is connected to a plurality of comparator devices, shown as COMP A, COMP B, and COMP C each having positive and negative inputs, and of a number which is one less than the predetermined number of the stages of divider network serving the thermostat VR3. The comparators COMP A, COMP B, COMP C, each have an output stage with one end connected to a resistor R28A, R28B, R28C, respectively, which, in turn, each has its other end connected to a voltage potential, shown as a ground connection in FIG. 5. Each of the output stages of COMP A, COMP B, and COMP C, further have a resistive network comprising at least one resistor, but preferably two resistors shown as groups R26A and R27A; R26B and R27B; and R26C and R27C. The node between the groups of resistors is connected to one of the inputs, shown as the positive input, respectively of comparators COMP A, COMP B, and COMP C. The other end of each of resistors R26A, R26B, and R26C is connected to the node between the thermistor T1 and the resistor R29. The other input (negative) of the comparators COMP A, COMP B, and COMP C, are respectively connected to the output of stages by the divider network and, more particularly, to the output of resistors R23, R24 and R25, as shown in FIG. 5.

In operation, and with reference to FIG. 5, the voltage divider network comprising R22, VR3, R23, R24 and R25 comprise a lengthy voltage divider with multiple taps that are routed to the comparator devices COMP A, COMP B and COMP C, as shown in FIG. 5. The thermostat VR3 and its adjustment changes the voltage span which feeds the inverting inputs of the three comparators COMP A, COMP B, and COMP C. More particularly, as VR3 is adjusted the voltages provided by R23, R24 and R25 and respectively routed to the negative (inverting) input of COMP A, COMP B and COMP C change by a corresponding proportional amount. The serial arrangement comprising the thermistor T1 and the resistor R29 form a room temperature sensing device that provides a corresponding proportional voltage which is fed into the non-inverting inputs of the same three converters COMP A, COMP B, and COMP C.

As the room temperature varies, as sensed by the thermistor T1, with respect to the VR3 thermostat setting, the voltage comparators COMP A, COMP B, and COMP C, turn on or off; feeding their outputs to ports P4, P5 and P6 respectively of the microcontroller 22. The port three inputs (P4, P5 and P6 which may be termed x) yield a maximum of (x+1) options of off, low, medium and high speeds. More particularly, the microcontroller 22 having knowledge of three voltages present at P4, P5 and P6, each representative of the difference between a desired temperature (VR3) for a room and the actual temperature (T1) of the room, may provide a voltage routed to either ports P12, P13 or P14 so that the motor 14 may be driven at a low, medium or high speed (or combinations thereof), allowing the difference between the actual and desired temperatures to be eliminated, and a pleasant environment provided to the user of the practice of the invention. It should be noted that the voltage division provided by the voltage divider network comprising resistors R22, R23, R24 and R25 yield a consecutive progressive response for the comparators COMP A, COMP B, and COMP C. The resistors R26A, R26B, R26C, R27A, R27B, and R27C, and R28A, R28B, and R28C, form the electronic hysteresis that prevents the output of the comparators COMP A, COMP B, and COMP C, from oscillating which, in turn, because of a steady voltage provided by the COMP A, COMP B and COMP C, allows the microcontroller 22 to provide the motor 14 with an operation that is void of any oscillating conditions. The resistors R28A, R28B and R28C, also serve as pull-up resistors. The microcontroller 22 receives the outputs from the comparators COMP A, COMP B and COMP C and operates in a manner as previously discussed to provide for all of the various modes of operation for the motor 14 also as previously described.

A further embodiment for adjusting the speed of a motor may be further described with reference to FIG. 6 which illustrates an arrangement 158 that has many of the features already described with reference to FIGS. 3 and 5. A comparison between FIG. 6 and FIGS. 3 and 5 reveals that all the triacs (Q1, Q2 and Q3) have been replaced with a transistor-bridge arrangement 158, and the wound motor 14 of FIGS. 3 and 5 having multiple windings has been replaced with a single winding (primary or first winding 72) motor 14A. The transistor-bridge arrangement 158 comprises a transistor device 160 having first, second and third terminals 162, 164 and 166, with the second terminal 164 serving as a gate thereof, and connected to the microcontroller 22 via a resistor R13 that is applied to a port, such as port P14, of microcontroller 22. The first and third terminals of the transistor 160 respectively serve as the emitter and the collector thereof. The transistor bridge 158 further comprises a full-wave bridge 168.

The full-wave bridge 168 comprises first, second, third and fourth diodes D6, D7, D8, D9 connected to form four sequential nodes 170, 172, 174, 176. The first and third nodes 170 and 174 are respectively connected to the first (162) and third (166) terminals of the transistor switch 160, whereas the second node 172 is connected to one side of the first winding 72 of the motor 14A and the fourth node 174 is connected to one of the terminals of the power source 50, e.g., the ground or AC common. The manual reverse switch 42 is used to reverse the direction of rotation of the motor 14A and operates in a manner as previously described with reference to FIG. 5.

In operation, and with reference to FIG. 6, the microcontroller 22 applies a varying base current to the transistor 160, via its second terminal 164 so as to allow a continuously variable speed for the operation of the motor 14A. The microcontroller 22 may vary the speed in a proportional manner with respect to the thermostat setting VR3 and the actual room temperature as sensed by the thermistor T1, in a manner as previously described hereinbefore with reference to FIGS. 3 and 5.

As discussed in the "Background" section, the use of a single setting thermostat such as thermostat VR3 of FIG. 5 or VR2 of FIG. 3 may cause the fan to operate with respect to the temperature of the air stream. Such undesirable servicing is eliminated by the embodiment schematically illustrated in FIG. 7.

Figure 7:
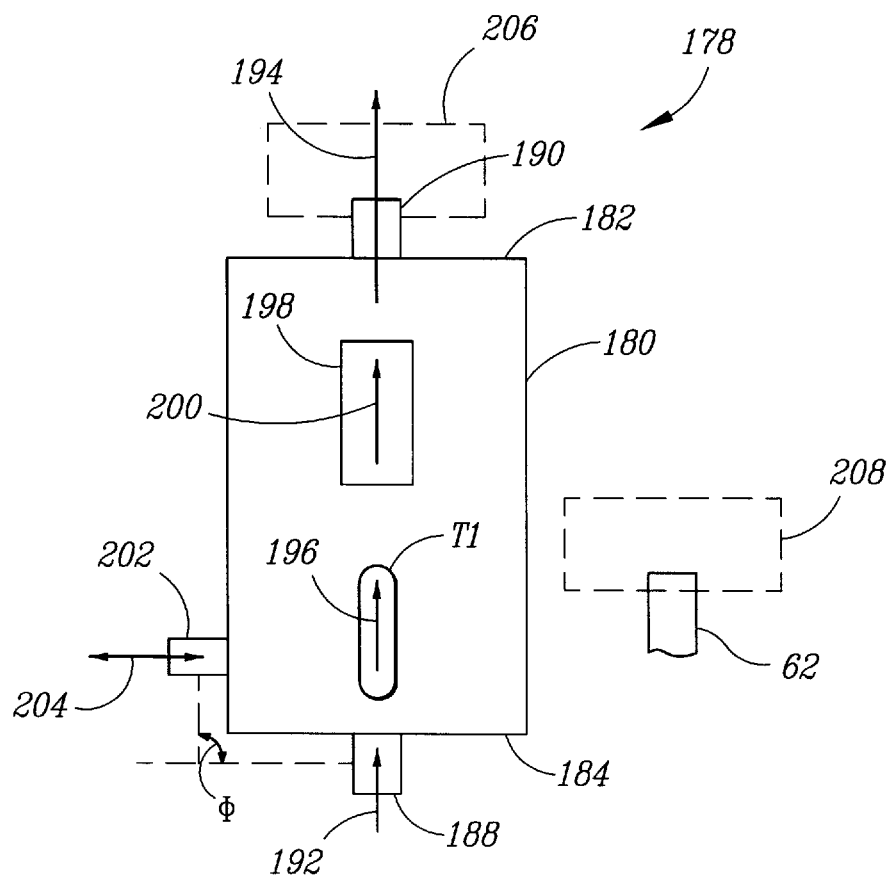
FIG. 7 is a schematic generally illustrating the physical placement of the temperature sensitive components of the present invention so as to eliminate the operation of a fan predicated on the temperature of the fan's air stream.

In general, the arrangement of FIG. 7 creates air flow over the thermistor T1 that yields a true representation of the room temperature and provides such by using the natural convection of the well-known chimney effect created by an artificial thermal catalyst.

FIG. 7 schematically illustrates an arrangement 178, wherein all the electronic elements of the respective embodiments previously described are placed into a conventional air-tight fabricated housing 180. The housing 180 has an operational vertical orientation, as illustrated in FIG. 7, with an upper end 182 and a bottom end 184. The housing 180 further has an inlet and an outlet 188 and 190, respectively, to allow air within a room being serviced by the practice of the present invention to enter into the housing 180, indicated by arrow 192, and exit the housing 180, as indicated by arrow 194. The thermistor T1, which senses the actual temperature of the room being serviced by the practice of the present invention, is located near the inlet 188 and the other components of the embodiments of FIGS. 2, 3, 5 and 6, such as the thermostat VR2 and other heat generating devices, such as those of FIG. 2, are located above the thermistor T1.

As seen in FIG. 7, the air flows into the inlet 188, passes over the thermistor T1 (as indicated by directional arrow 196) and then passes over the other components (generally indicated by the box 198) as indicated by arrow 200, and then flows out of the exhaust 190, as indicated by directional arrow 194. In operation, by placing the heat dissipating components, such as those of the power supply 64 (see FIG. 2) R1, R2 and regulator 68 above the thermistor T1, a natural chimney effect is created causing air to move over the thermistor T1 without interfering with the thermistor's T1 ability to measure room temperature. Another advantage of the chimney effect is that the thermistor T1 need not be exposed to the fan draft duct 202 passing air as indicated by directional arrow 204. Such non-effect is provided if inlet 188 is offset from the fan draft 202 by a preferred angle of Φ of 90°, as shown in FIG. 7.

A further improvement of the chimney effect is provided if the outlet or exhaust vent 190 is exposed on the inside of the blade housing 206 of the fan 12, and if the housing 180 is located near the rotating blades (not shown) which are driven by the shaft 62 of the fan 12 (see FIG. 2). For such a preferred location, schematically illustrated in FIG. 7, a natural vacuum effect is created when the motor 14 or 14A is running regardless of the direction of motor rotation, thereby causing additional air to find its way back to and flow over the thermistor T1.

It should now be appreciated that the practice of the present invention provides for various embodiments that allow for the temperature in the room being serviced by the fan to be accurately measured and for the operation of the fan to closely track the temperature conditions of the room being serviced by the fan.

Still further, although the invention has been described relative to the specific embodiments thereof, it is not so limited and many modifications and variations thereof will become readily apparent to those skilled in the art in light of the above teaching.

We claim:

1. A system for controlling a fan particularly suited for being mounted in a window, said fan comprising a motor responsive to a control signal and excited by a power source with first and second terminals and having a predetermined frequency, said system comprising:

(a) means for selecting a desired temperature and providing a first electrical signal representative thereof;

(b) means for sensing an actual temperature and providing a second electrical signal representative thereof;

(c) means for receiving, sampling and interpreting said first and second electrical signals, said interpreting including determining the difference between said first and second electrical signals and generating said control signal to said motor when said difference therebetween exceeds a predetermined value;

wherein said means for selecting a desired temperature and said means for sensing an actual temperature each include means for converting said respective electrical signals into a corresponding pulse count.

2. The system for controlling a fan according to claim 1, wherein said means for receiving, sampling and interpreting compares said pulse count of said first and second electrical signals against each other to determine said difference therebetween.

3. The system for controlling a fan according to claim 1, wherein said means for converting said first signal comprises a serial arranged capacitor and negative temperature coefficient device with a node therebetween and having opposite ends respectively connected to opposite voltage potentials and said node therebetween being connected to said means for receiving, sampling and interpreting.

4. The system for controlling a fan according to claim 3, wherein said negative temperature coefficient device is a thermistor, and/or thermocouple.

5. The system for controlling a fan according to claim 1, wherein said means for converting said first signal comprises a serial arranged capacitor and a thermocouple device with a node therebetween and having opposite ends respectively connected to opposite voltage potentials and said node therebetween being connected to said means for receiving, sampling and interpreting.

6. The system for controlling a fan according to claim 1, wherein said means for converting said second signal comprises a serial arrangement of a capacitor, at least one resistor, and a thermostat with a node between the at least one resistor and the capacitor and having opposite ends respectively connected to opposite voltage potentials and said node therebetween being connected to said means for receiving, sampling and interpreting.

7. The system for controlling a fan according to claim 6 further comprising an adjustable resistor interposed between said at least one resistor and said thermostat.

8. The system for controlling a fan according to claim 1, wherein said means for selecting a desired temperature and said means for sensing an actual temperature comprises;

(a) a divider network comprised of a plurality of stages of a predetermined number with each stage including a resistor and the first stage thereof also including a thermostat, said divider network having opposite ends connected to opposite voltage potentials;

(b) a serial arrangement of a negative temperature coefficient device and a resistor having a node therebetween and opposite ends connected to opposite voltage potential;

(c) a plurality of comparator devices with positive and negative inputs and of a number which is less than said predetermined number of said divider network, each of said comparator devices having an output stage having one end of a resistor connected thereto and with the other end of said resistor connected to one of said opposite voltage potentials of said divider network, each of said output stages further having a resistive network comprising at least one resistor having a first end connected to said output stage and its second end connected to one of said positive and negative inputs, said other positive and negative inputs respectively connected to one of the output stages of said divider network, said node between serial arrangement of said negative temperature coefficient and said resistor having means for being connected to said first end of said resistor of said resistive network, said output stages of each of said comparator devices connected to said means for receiving, sampling and interpreting.

9. The system for controlling a fan according to claim 8, wherein said negative temperature coefficient device is a thermistor, and/or thermocouple.

10. The system for controlling a fan according to claim 8 further comprising a capacitor arranged across said resistor of said serial arrangement of the negative temperature coefficient device.

11. A system for controlling a fan particularly suited for being mounted in a window, said fan comprising a motor responsive to a control signal and excited by a power source with first and second terminals and having a predetermined frequency, said system comprising:

(a) means for selecting a desired temperature and providing a first electrical signal representative thereof;

(b) means for sensing an actual temperature and providing a second electrical signal representative thereof;

(c) means for receiving, sampling and interpreting said first and second electrical signals, said interpreting including determining the difference between said first and second electrical signals and generating said control signal to said motor when said difference therebetween exceeds a predetermined value;

wherein said means for selecting a desired temperature and said means for sensing an actual temperature comprises;

(a) a divider network comprised of a plurality of stages of a predetermined number with each stage including a resistor and the first stage thereof also including a thermostat, said divider network having opposite ends connected to opposite voltage potentials;

(b) a serial arrangement of a thermocouple device and a resistor having a node therebetween;

(c) a plurality of comparator devices with positive and negative inputs and of being a number which is less than said predetermined number of said divider network, each of said comparator devices having an output stage having one end of a resistor connected thereto and with the other end of said resistor connected to one of said opposite voltage potentials of said divider network, each of said output stages further having a resistive network comprising at least one resistor having a first end connected to said output stage and its second end connected to one of said positive and negative inputs, said other positive and negative inputs respectively connected to one of the output stages of said divider network, said node between serial arrangement of said thermocouple device and said resistor having means for being connected to said first end of said resistor of said resistive network, said output stage of each of said comparator devices connected to said means for receiving, sampling and interpreting.

12. The system for controlling a fan according to claim 11 further comprising a capacitor arranged across said resistor of said serial arrangement of said thermocouple device.

13. The system for controlling a fan according to claim 1, wherein said first and second electrical signals are sampled at a sampling rate of about 50 milliseconds.

14. The system for controlling a fan according to claim 1 further comprising a power supply having said power source applied thereto, said power supply having input and output stages and arranged as a half-wave converter, said input stage having means for limiting inrush current, limiting transients and providing over-current protection, said output stage having energy storage means that stores a charge for a predetermined duration after loss of said applied power source and a regulator that provides a constant voltage in spite of any variations in said power source and those in a load connected to the output stage; said power supply producing and delivering the power needed to operate said means for selecting a desired temperature, said means for sensing an actual temperature and said means for receiving, sampling and interpreting.

15. The system for controlling a fan according to claim 1, wherein said interpreting means for generating said control signal for said motor comprises first, second and third triac means, and wherein said motor has first and second windings each having first and second ends, said second winding controlling the speed of said motor and having one of its ends connected to a first end of a capacitor having its other end connected to one of said terminals of said power source, said second winding further having first and second connections, said first, second and third triac means being respectively connected to said first and second connection of said second winding and said other end of said second winding.

16. The system for controlling a fan according to claim 15 further comprising first, second and third serial arrangements each comprising a resistor and a light emitting diode respectively interposed between first, second and third transistors and said interpreting means.

17. The system for controlling a fan according to claim 1, wherein said interpreting means for generating said control signal comprises a transistor-bridge arrangement and wherein said motor has a first winding with first and second ends, said first winding controlling the speed of said motor and having its first end connected to one of said terminals of said power source and its second end connected to an output of said transistor-bridge arrangement, said transistor-bridge arrangement comprising:

(a) a first transistor having first, second and third terminals with the second terminal connected to the gate thereof and having means for being connected to said interpreting means, said first and third terminals connected to the emitter and collector thereof; and (b) first, second, third and fourth diodes connected together to form four sequential nodes and arranged into a full-wave bridge, said first and third node being connected to said first and third terminals, said second node being connected to the second end of said first winding of said motor and said fourth node connected to the other terminal of said power source.

18. The system according to claim 17 further comprising a resistor serving as said connecting means of said second terminal and interposed between said second terminal and said interpreting means.

19. The system for controlling a fan according to claim 15 further comprising a reversing switch device having means responsive to an external signal for reversing the direction of rotation of said motor, said reversing switch having first, second, third and fourth terminals, wherein said connection between said first transistor means and said first connection of said second winding is connected to said first terminal of said reversing switch and said first and second ends of said first winding are respectively connected to second and third terminals of said reversing switch, said fourth terminal of said reversing switch being connected to one of said terminals of said power source.

20. The system for controlling a fan according to claim 15 further comprising a manually controlled reversing switch device for reversing the direction of rotation of said motor, said reversing switch having first, second, third and fourth terminals, wherein said connection between said first transistor means and said first connection of said second winding is connected to said first terminal of said reversing switch and second first and second ends of said first winding are respectively connected to the second and third terminals of said reversing switch, said fourth terminal of said reversing switch being connected to one of said terminals of said power source.

21. The system for controlling a fan according to claim 17 further comprising a reversing switch device having means responsive to an external signal for reversing the direction of rotation of said motor, said reversing switch having first, second and third terminals, wherein said second end of said first windings is connected to said first terminal of said reversing switch and said first end of said first winding is connected to the second terminal of said reversing switch, said third terminal of said reversing switch being connected to one of said terminals of said power source.

22. The system for controlling a fan according to claim 17 further comprising a manually controlled reversing switch device for reversing the direction of rotation of said motor, said reversing switch having first, second and third terminals, wherein said second end of said first winding is connected to said first terminals of said reversing switch and said first end of said first winding is connected to the second terminal of said reversing switch, said third terminal of said reversing switch being connected to one of said terminals of said power source.

23. The system for controlling a fan according to claim 15 further comprising fourth, fifth and sixth serial arrangements each comprising a resistor and a light emitting diode and each having one end separately connected to said interpreting means and its other end joined together and connected to an output of said power supply.

24. The system for controlling a fan according to claim 15 further comprising an annunciator comprising a piezoelectric device having one end connected to said interpreting means and its other end connected to an output of said power supply.

25. The system for controlling a fan according to claim 17 further comprising an annunciator comprising a piezoelectric device having one end connected to said interpreting means and its other end connected to an output of said power supply.

26. The system for controlling a fan according to claim 1, wherein said means for selecting a desired temperature, said means for sensing an actual temperature, and said means for receiving, sampling and interpreting are all arranged within a housing having an operational vertical orientation with a top and bottom end, said housing having an inlet and outlet respectively to allow air to enter into and exit from said housing, said inlet located on said bottom end of said housing, said means for sensing an actual temperature located near said inlet and said means for selecting a desired temperature and said means for receiving, sampling and interpreting located above said means for sensing an actual temperature.

27. The system for controlling a fan according to claim 26, wherein said fan has a draft duct and said inlet of said housing is located at an angle of about 90° relative to said draft duct.

* * * * *